(12) United States Patent
Rusko

(10) Patent No.: US 11,937,613 B2
(45) Date of Patent: Mar. 26, 2024

(54) CONVEYING UNIT DESIGNED AND CONFIGURED FOR AUTOMATICALLY CONVEYING FILLET-LIKE MEAT PRODUCTS, IN PARTICULAR FISH FILLETS, AND METHOD RELATING TO SAME

(71) Applicant: Nordischer Maschinenbau Rud. Baader GmbH + Co. KG, Lübeck (DE)

(72) Inventor: Torsten Rusko, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 168 days.

(21) Appl. No.: 17/433,412

(22) PCT Filed: Apr. 9, 2019

(86) PCT No.: PCT/EP2019/058970
§ 371 (c)(1),
(2) Date: Aug. 24, 2021

(87) PCT Pub. No.: WO2020/207567
PCT Pub. Date: Oct. 15, 2020

(65) Prior Publication Data
US 2022/0053784 A1 Feb. 24, 2022

(51) Int. Cl.
*A22C 25/00* (2006.01)
*A22C 25/08* (2006.01)

(52) U.S. Cl.
CPC .................. *A22C 25/08* (2013.01)

(58) Field of Classification Search
CPC ...................................................... A22C 25/08
(Continued)

(56) References Cited

U.S. PATENT DOCUMENTS 2,961,696 A 11/1960 Michael
4,868,951 A 9/1989 Akesson et al.
(Continued)

FOREIGN PATENT DOCUMENTS

CN 1128939 A 8/1996
CN 206612115 U 11/2017
(Continued)

OTHER PUBLICATIONS

International Search Report dated Dec. 20, 2019; International Applicaiton No. PCT/EP2019/058970.

*Primary Examiner* — Richard T Price, Jr.
(74) *Attorney, Agent, or Firm* — DINSMORE & SHOHL LLP

(57) ABSTRACT

A conveying unit is designed and configured for automatically conveying fillet-like meat products, in particular fish fillets. The conveying unit has a first conveying element rotationally driven by a drive and a second conveying element rotationally driven by a drive, in transport direction of the meat products to be conveyed. The second conveying element is downstream of the first conveying element. The two conveying elements form a continuous transport path, along which different processing stations may be arranged. The first conveying element is a double belt with a gap running centrally and parallel to the transport direction, while the second conveying element is a segment chain which is triangular in cross-section. A method is also disclosed.

20 Claims, 4 Drawing Sheets

(58) Field of Classification Search
USPC .......................................................... 452/179
See application file for complete search history.

(56) References Cited

U.S. PATENT DOCUMENTS

| | | | |
|---|---|---|---|
| 5,358,441 A * | 10/1994 | Hjorth | A22C 25/14 |
| | | | 452/179 |
| 5,378,194 A | 1/1995 | Hjorth | |
| 5,425,668 A * | 6/1995 | Martin | A22C 21/0015 |
| | | | 452/54 |
| 5,466,186 A | 11/1995 | Hjorth | |
| 5,492,502 A | 2/1996 | Hjorth | |
| 5,492,503 A * | 2/1996 | Davis | A22C 21/0069 |
| | | | 452/179 |
| 5,702,295 A | 12/1997 | Ketels | |
| 2018/0160692 A1 | 6/2018 | Paulsohn | |

FOREIGN PATENT DOCUMENTS

| | | |
|---|---|---|
| DE | 2939625 A1 | 4/1981 |
| EP | 3169161 A2 | 5/2017 |
| JP | 3517875 B2 | 9/1958 |

* cited by examiner

CONVEYING UNIT DESIGNED AND CONFIGURED FOR AUTOMATICALLY CONVEYING FILLET-LIKE MEAT PRODUCTS, IN PARTICULAR FISH FILLETS, AND METHOD RELATING TO SAME

CROSS-REFERENCE TO RELATED APPLICATIONS

This application is the U.S. National Stage of PCT/EP2019/058970 filed Apr. 9, 2019, the content is incorporated herein by reference in its entirety.

FIELD OF THE INVENTION

The invention relates to a conveying unit, designed and configured for automatically conveying fillet-like meat products, in particular fish fillets, with a first conveying element, rotationally driven by a drive means, and a second conveying element, rotationally driven by a drive means in transport direction T of the meat products to be conveyed, which is downstream of the first conveying element, the two conveying elements forming a continuous transport path, along which different processing stations may be arranged.

Furthermore, the invention relates to a method for automatically conveying fillet-like meat products, in particular fish fillets, comprising the steps:—transporting the meat products by means of a first conveying element along the transport path in transport direction T, transferring the meat products to a second conveying element in a transition region, and transporting the meat products by means of the second conveying element along the transport path in transport direction T.

BACKGROUND OF THE INVENTION

Such conveying units and methods are used in the meat processing industry, particularly in the processing and handling of fish fillets, in order to transport the fillet-like meat products to be processed along the transport path in a manner adapted to the relevant processing station. In the case of fish, fillet-like meat products are described as products freed from the skeleton, and in particular also from the central bone, which have a lower height in relation to their width and length. The same applies to meat products of other animal species.

When processing tuna and similar species that undertake long-distance migrations and accordingly have a particular muscle structure, due consideration must be given to the special characteristics of the muscle structure. Taking tuna as an example, the fish fillets detached from the skeleton, and in particular from the backbone/central bone, show an inhomogeneous muscle structure. This means that there are different proportions of meat and muscle. In addition to the "normal" muscle meat, which is usually light-coloured, the fish fillets also have a region of dark muscle meat starting from the region of the (removed) central bone towards the skin side. The dark muscle meat, the so-called red meat, is of inferior quality in terms of taste such that it should be removed as completely as possible.

The region of the central bone divides the fish fillet into a notional dorsal-side partial fillet and a ventral-side partial fillet. In other words, the region of the fish fillet which extends upwards, starting from the central bone towards the dorsal fins, is referred to as the dorsal-side partial fillet, while the region of the fish fillet which extends downwards, starting from the central bone towards the abdominal cavity, is referred to as the ventral-side partial fillet. The term "fish fillet" refers not only to such products which no longer have any bones at all but also, in particular, to such products in which at least the central bone is removed so that the strip of red meat on the side directed away from the skin side is exposed. Accordingly, the fish fillets are processed and transported with the skin side down.

The spread of the red meat, however, also referred to as dark meat, within the fish fillet makes it impossible to remove it with a single cut at a processing station. The spread of the red meat actually deviates from a classic V-shape and varies from fish fillet to fish fillet. Accordingly, a simple V-cut results either in red meat remaining in the fish fillet or light muscle meat being removed in addition to the red meat. The red meat must therefore be removed in a plurality of steps with at least two cutting apparatuses arranged one behind the other in direction of transport T. A conveying unit is required to move the fish fillets to be processed from processing station to processing station.

Typically, in known conveying units, two or more rotationally driven conveyor belts are arranged one behind the other to transport the meat products to be processed from processing station to processing station, thus, using the example of removing red meat from tuna fillets, from cutting apparatus to cutting apparatus. In this case, the fillet-like meat products lie flat on the corresponding conveyor belts. Using the example of removing the red meat from the fish fillet, this results in each fish fillet being arranged on both conveyor belts in the same position in relation to the processing stations/cutting apparatuses arranged above the conveyor belts. This results in identical cutting positions which means that only identical regions in the fish fillet can be cut. To be able to cut different regions on the fish fillet when the fish fillets are in identical situations/positions on the conveyor belts, the processing stations would have to be elaborately designed and controlled with regard to their movement in space.

However, particularly when removing red meat strips from tuna fillets, there are regions in the fish fillet that are difficult or impossible for the processing stations to reach due to the special muscle structure. Using the example of removing the red meat from tuna fillets, regions of the red meat therefore remain which cannot be reached by the processing stations/cutting apparatuses during transport on conventional conveyor belts. In other words, the known conveying units only allow for standardised positioning of the meat products to be processed which is identical for all processing stations along the transport path in relation to the processing station along the transport path.

SUMMARY OF THE INVENTION

The object of the invention is therefore to create a simple conveying unit which ensures positioning of the meat products to be processed in a manner adapted to the relevant processing station. The object of the invention is also to create a corresponding method.

This object is achieved by a conveying unit with the features referred to hereinbefore in that the first conveying element is designed as a double belt with a gap running centrally and parallel to the transport direction T, while the second conveying element is designed as a segment chain which is triangular in cross-section. With this embodiment of the conveying unit according to the invention, said conveying unit is adapted to the relevant processing station in such a manner that the fillet-like meat products are each placed in an optimum location/position in relation to the processing station. Using the example of a conveying unit for automatically conveying tuna fillets, the double belt as the first conveying element provides for flat positioning/placing of the tuna fillets, e.g. on their skin side, in order to be able, for example, to cut a first middle, central partial strip of red meat from the tuna fillet. The segment chain, which is triangular in cross-section, as the second conveying element ensures that the tuna fillets are not only transported continuously along the transport path but also lie in an opened-up position due to the shape of the segment chain, in order to be able, for example, to cut ventral-side and/or dorsal-side partial strips of red meat from the tuna fillet. The segment chain, which is triangular in cross-section, causes the partial fillets to fold to the side and downwards by the force of gravity alone on leaving the double belt, in such a manner that regions of the red meat strip which were still facing each other on the double belt now point upwards or at least obliquely upwards on the segment chain. The conveying unit thus enables different positioning of the tuna fillets, adapted to different processing stations. Simply put, by means of the two different conveying elements, the conveying unit presents different regions of the meat product towards the processing station placed above the conveying unit, such that the processing stations can be brought into engagement in different planes with different regions of the meat product to be processed.

A preferred development is characterised in that the double belt and the segment chain overlap in a transition region, in such a manner that the meat products to be transported are temporarily in contact with both conveying elements at the same time. This ensures reliable transfer of the meat product. In this context, overlapping means that the exit of the first conveying element is downstream of the entry region of the second conveying element in transport direction T.

Advantageously, the double belt and the segment chain form a continuous conveying unit running substantially horizontally in transport direction T, the segment chain engaging in the double belt from below through the gap, at least in the transition region from double belt to the segment chain, for transferring the meat products to be transported from the double belt. In the transition region, the meat product is thus in contact with the double belt on the one hand and the segment chain on the other hand. This ensures continuous conveying of the meat products along the entire transport path.

A preferred embodiment of the conveying unit is characterised in that the double belt comprises two partial belts arranged at a distance from each other, each of which has a transport run and a return run, the two transport runs forming a continuously level and horizontal transport surface with their transport side directed upwards in each case. The first conveying element thus enables level positioning of the fillet-like meat products which, using the example of the tuna fillet, lie flat, e.g. with their skin side on the transport run. As a result, it is possible, for example, to make a first cut into the depth towards the skin side with a first processing station in order to cut the middle central partial strip of red meat from the tuna fillet.

A preferred development is characterised in that the segment chain comprises a transport run and a return run and is formed from a plurality of individual segments, each segment having a base section and a roof-shaped support section, such that the segment chain with the transport run, starting from a tip of the roof-shaped support sections, forms an angled transport surface with transport partial surfaces sloping laterally and downwards on both sides of the segment chain. The second conveying element thus enables the fillet-like meat products to be positioned in an unfolded or opened-up position, in such a manner that the partial fillets, i.e. the ventral-side and the dorsal-side partial fillet, still lying on the skin side, hang down on both sides of the segment chain. In other words, the segment chain with its segments forms an inverted V-shape, such that the meat products, which preferably lie centrally on the segment chain in their longitudinal extension, hang down with their partial fillets on both sides. As a result, ventral-side and dorsal-side partial strips of red meat point upwards, such that a second and/or a third cut can be made mainly in the ventral region or in the dorsal region, virtually parallel to the skin side, in order to cut the ventral-side and dorsal-side partial strips of red meat from the tuna fillet.

Advantageously, the base section and the support section are integrally connected to each other, the support sections pointing upwards in the transport run in the direction of the gap of the double belt and protruding with their tip at least partially through the gap beyond the plane, i.e. the transport surface, defined by the double belt. The defined plane refers to the transport surface of the double belt. On the one hand, this embodiment ensures reliable transfer of the meat products from the double belt and holding of the meat products on the segment chain in a simple manner, and on the other hand it creates a simple construction of the segments and thus of the segment chain.

In a preferred embodiment, the segments of the segment chain have at least in part spike-like protrusions in the region of the tip of the support sections for fastening the meat products to be transported. This ensures additional fastening of the meat products on the segment chain, as a result of which the meat products are secured against slipping on the segment chain and can be transported accurately positioned. Another advantageous effect of the spike-like protrusions is that they assist the partial fillets to bend on both sides of the segment chain, which is triangular or more accurately roof-shaped in cross-section, i.e. they help to open up the fillet-like meat products.

Preferably, devices for holding the fish down are assigned to the segment chain downstream of the double belt in transport direction T at least along a portion of the transport path, the devices for holding the fish down being arranged on both sides of the segment chain and extending at a distance from the segment chain and parallel thereto. Using the devices for holding the fish down, the meat products or the partial fillets opened up on both sides can be fastened between hold-down device and segment chain on both sides of the segment chain. Due to transporting the fillet-like meat products in transport direction T, the meat products or the partial fillets hanging down on both sides of the segment chain thread between the segment chain, which supports from below, and the device for holding the fish down, which holds from above, as a result of which the partial fillets are held securely and precisely during processing. Together with the segment chain, the devices for holding the fish down thus ultimately form a means for opening up or they assist the segment chain at least during the opening up process, as they reliably hold the partial fillets in the spread position.

Especially preferably, the devices for holding the fish down are designed as rotationally driven conveyor belts with a guide run and a return run, guiding surfaces of the guide run being aligned parallel to support surfaces of the support sections of the segments of the segment chain. This optimises fastening or holding of the partial fillets in position during transport along the transport path.

An advantageous embodiment of the conveying unit is characterised in that the gap of the double belt is covered at least partially by a cover element, the cover element comprising a gap at least in the transition region, which gap has a smaller width transverse to the transport direction T than the gap of the double belt. The gap necessary for immersion of the segment chain is covered by the cover element in regions in which the segment chain is not immersed, such that the support surface for the fillet-like meat products is enlarged and the meat products are prevented from sagging.

Advantageously, both conveying elements and their drive means are connected to a control device. As a result, it is possible to match the drive speeds of the two conveying elements to each other and, if necessary, to processing stations arranged along the transport path.

The object is also achieved by a method with the steps referred to hereinbefore in that the meat products are transported on a double belt with a gap running centrally and parallel to the transport direction T as the first conveying element and are taken over in the transition region by a segment chain, which is triangular in cross-section, as the second conveying element, the meat products being transported onwards by the segment chain.

The meat products are preferably transported at least in the transition region by both the double belt and the segment chain at the same time.

In an advantageous development, the meat products are transported lying flat on the double belt along a continuously level and horizontal transport surface, while the meat products on the segment chain are transported in an angled position along an angled transport surface with transport partial surfaces sloping laterally and downwards on both sides of the segment chain.

Especially preferably, the method is carried out using a conveying unit as disclosed herein.

The advantages arising from this have already been described in connection with the conveying unit, which is why reference will be made to the relevant passages to avoid repetitions.

BRIEF DESCRIPTION OF THE DRAWINGS

Further expedient and/or advantageous features and developments of the conveyor unit and the method are also disclosed herein. Especially preferred embodiments of the conveying unit and the method are explained in greater detail with reference to the attached drawing. The drawing shows.

DETAILED DESCRIPTION OF THE INVENTION

Figure 1:
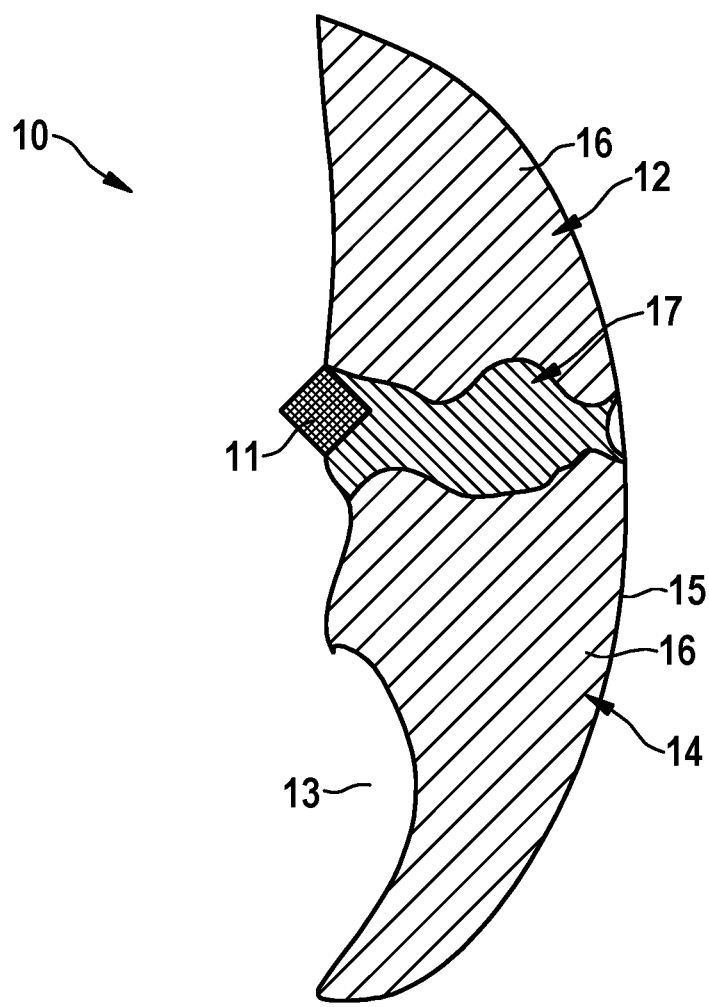
FIG. 1 is an axial cross-section through a fish fillet with a central bone and the skin side opposing the central bone.

The conveying unit illustrated in the drawing shows a conveying element for transporting tuna fillets. The conveying unit according to the invention is designed and configured in the same manner for transporting other fillet-like meat products, such as chicken breast fillets or the like, and is accordingly suitable therefor.

To facilitate better understanding of the necessity for individually positioning the meat products to be processed on the conveying unit, the muscle structure of a tuna or its fish fillets 10 and of comparable species will first be explained based on FIGS. 1 and 2. FIG. 1 shows a single fish fillet 10 of a tuna with two fillets. The single fish fillet 10 still has a central bone 11 in the illustration. Starting from the central bone 11, the dorsal-side partial fillet 12 extends upwards towards a dorsal fin which is not shown. Starting from the central bone 11, the ventral-side partial fillet 14 extends downwards towards an abdominal cavity 13 (only indicated). The skin side 15 of the fish fillet 10 is located on the side opposite the central bone 11. The fish fillet 10 consists mainly of "normal" light muscle meat 16. However, starting from the central bone 11, a partially asymmetrical strip 17 of red meat extends towards the skin side 15. This strip 17 has an individual spread within the muscle meat 16 for each fish fillet 10.

Figure 2:
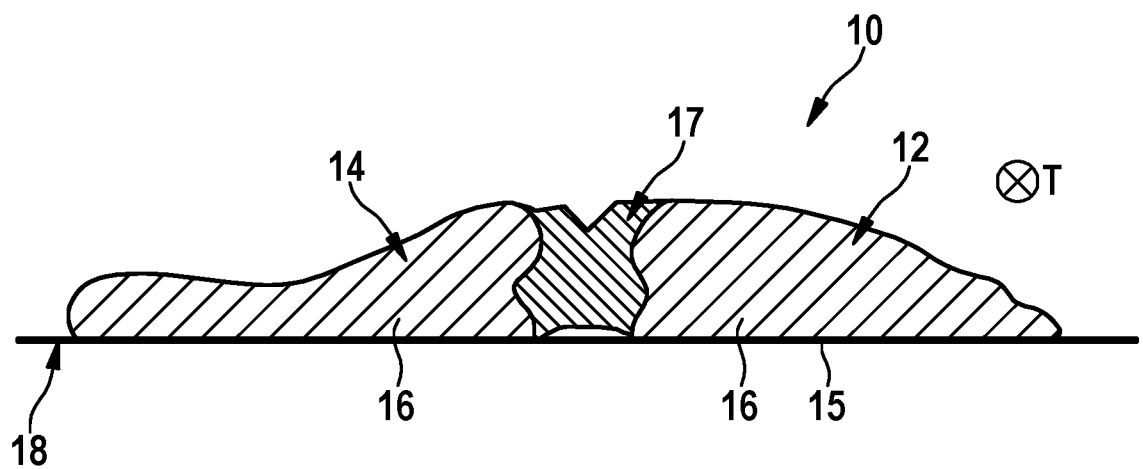
FIG. 2 is a drawing showing the fish fillet according to FIG. 1 without the central bone, with the skin side lying on a conveying unit.

FIG. 2 shows the fish fillet 10 according to FIG. 1 without the central bone 11, the fish fillet 10 lying on the skin side 15. As a result, the strip 17 of red meat points upwards, the strip 17 being oriented substantially in transport direction T in the longitudinal direction of the fish fillet 10. The strip 17 extends transverse to the transport direction T in the region of the two partial fillets 12, 14.

The conveying unit 18 illustrated is designed and configured for automatically conveying fillet-like meat products, in particular fish fillets 10, with a first conveying element 19 rotationally driven by a drive means and a second conveying element 20, rotationally driven by a drive means in transport direction T of the meat products to be conveyed, which is downstream of the first conveying element 19, the two conveying elements 19, 20 forming a continuous transport path, along which different processing stations may be arranged. The conveying elements 19, 20 are guided around deflecting and/or drive elements which are not explicitly shown.

This conveying unit 18 is characterised according to the invention in that the first conveying element 19 is designed as a double belt 21 with a gap 22 running centrally and parallel to the transport direction T, while the second conveying element 20 is designed as a segment chain 23 which is triangular in cross-section. The main function of the double belt 21 is to transport fillet-like meat products lying flat in one plane on the double belt and accordingly it is designed to be level. The gap 22 enables the engagement of processing stations and/or other conveying means. The segment chain 23 has a dual function, namely, on the one hand, to open up the meat products to be transported and, on the other hand, to transport the opened-up meat products in an angled position, and is accordingly designed with an angled profile.

When taken on their own or in combination with each other, the features and developments described below illustrate preferred embodiments. It is expressly pointed out that features which are summarised in the claims and/or the description and/or the drawing or are described in a common embodiment can also further develop the conveying unit 18 described above in a functionally independent manner.

Figure 3:
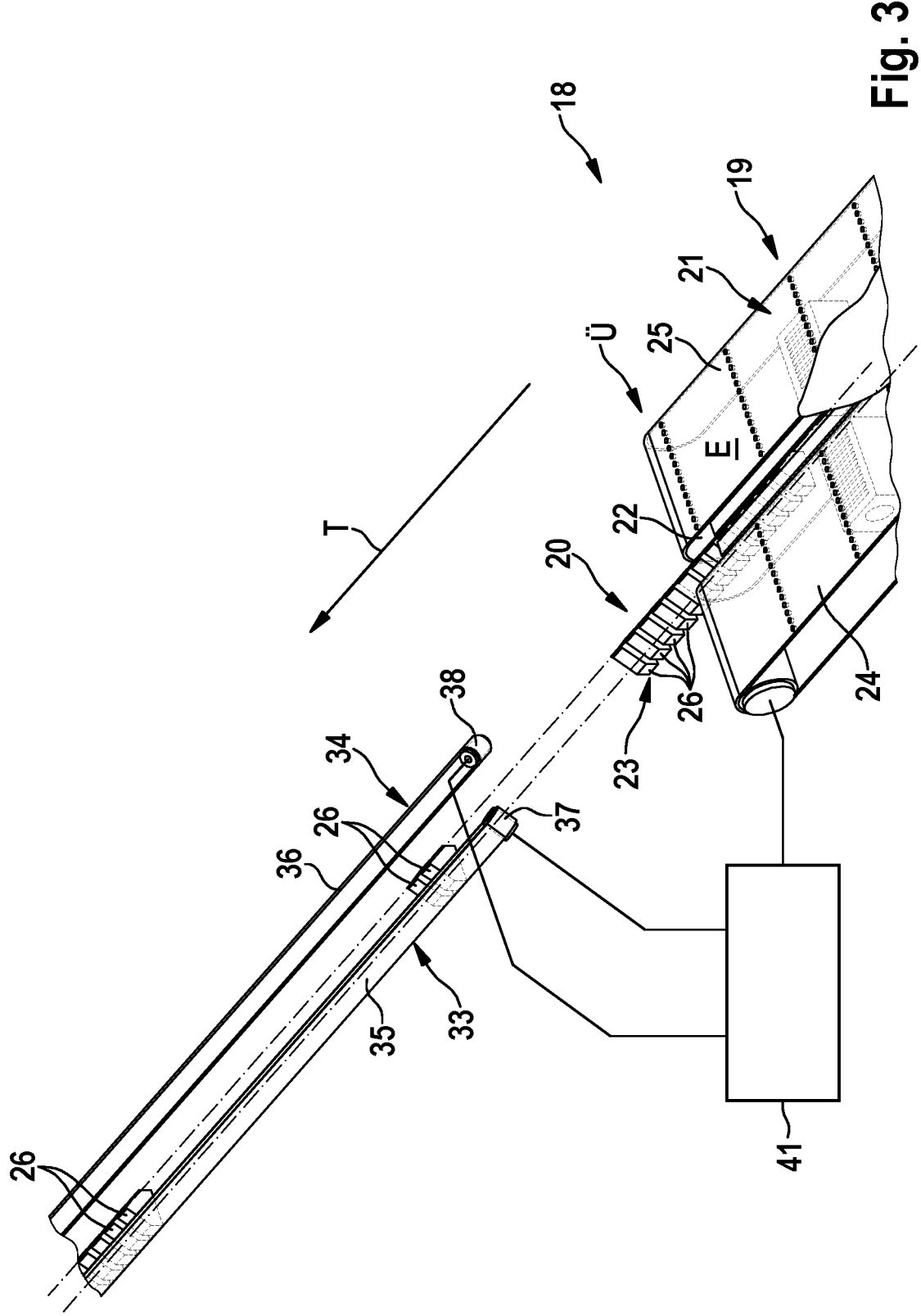
FIG. 3 is a schematic illustration of a conveying unit with a double belt as the first conveying element and a segment chain with devices for holding the fish down as the second conveying element.
Figure 4:
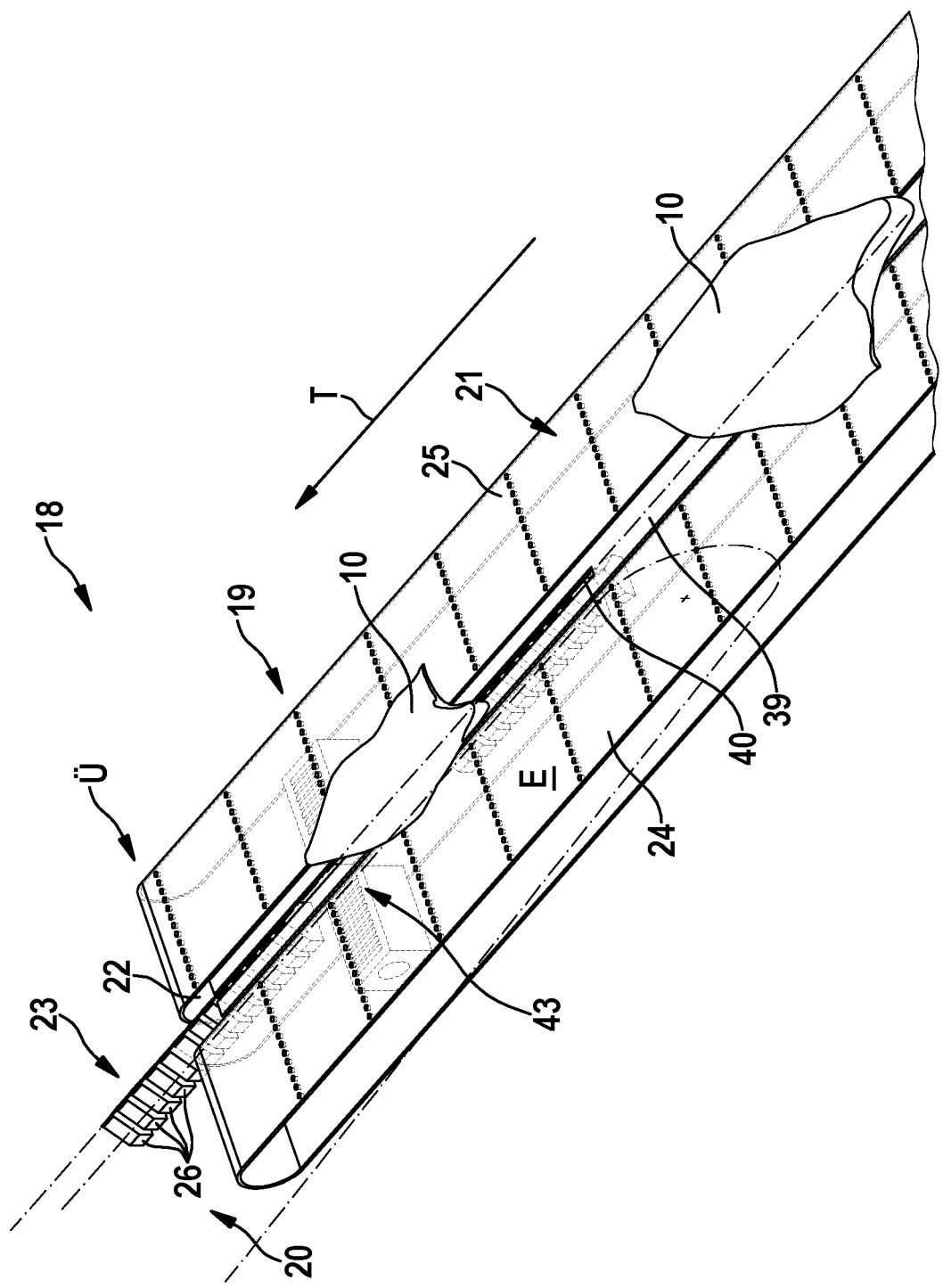
FIG. 4 is an enlarged illustration of the double belt with the transition region to the segment chain.

As indicated, the two conveying elements 19, 20 form a continuous transport path so that the fillet-like meat products can be transported continuously. The conveying elements 19, 20 can follow each other directly, practically seamlessly, in transport direction T. Preferably, the double belt 21 and the segment chain 23 overlap in a transition region Ü, in such a manner that the meat products to be transported are temporarily in contact with both conveying elements 19, 20 at the same time. In particular, it can be seen in FIGS. 3 and 4 that the second conveying element 20 already starts in transport direction T, while the first conveying element 19 has not yet finished. The length of the transition region Ü is variable.

The double belt 21 and the segment chain 23 form a continuous conveying unit 18 running substantially horizontally in transport direction T, the segment chain 23 engaging in the double belt 21 from below through the gap 22, at least in the transition region Ü from the double belt 21 to the segment chain 23, for taking over the meat products to be transported from the double belt 21. The engagement may mean that the segment chain 23 is in the gap 22 at least in sections, without the segment chain 23 protruding beyond the transport surface formed by the double belt 21. Optionally, the segment chain 23 may also protrude partially from or beyond the transport surface.

The double belt 21 preferably comprises two partial belts 24, 25 arranged at a distance from each other, each of which has a transport run and a return run, the two transport runs forming a continuously level and horizontal transport surface with their transport side directed upwards in each case, so that the meat products lie flat on the transport surface and can be transported in this way. The partial belts 24, 25 may be guided and driven completely separately from each other with separate guiding and/or drive elements. In other embodiments, the partial belts 24, 25 may be arranged at a distance from each other on the same guiding and drive elements. The gap 22 may extend over a part of the length of the double belt 21 or over the entire length of the double belt 21, the gap 22 oriented in the transport direction T being arranged centrally in all preferred embodiments, in such a manner that the gap 22 divides the double belt 21 symmetrically.

Figure 5:
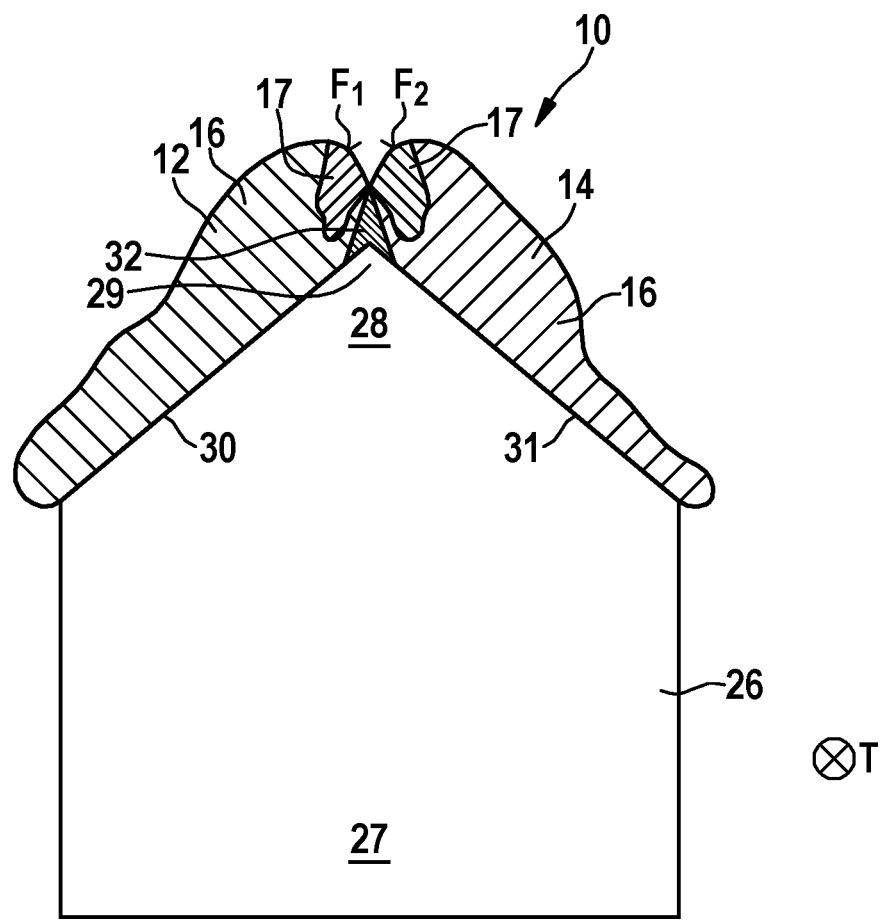
FIG. 5 is a sectional view through a segment chain on which an opened-up fish fillet is located.

The segment chain 23 comprises a transport run and a return run and is formed from a plurality of individual segments 26, each segment 26 having a base section 27 and a roof-shaped support section 28, such that the segment chain 23 with the transport run, starting from a tip 29 of the roof-shaped support sections 28, forms an angled transport surface with transport partial surfaces 30, 31 sloping laterally and downwards on both sides of the segment chain 23. Such a segment 26 is illustrated in detail in FIG. 5. Each segment 26 is triangular or roof-shaped in cross-section. It is preferable that the base section 27 and support section 28 are integrally connected to each other, the support sections 28 pointing upwards in the transport run in the direction of the gap 22 of the double belt 21 and protruding with their tip 29 at least partially through the gap 22 beyond the plane E, i.e. the transport surface, defined by the double belt.

The segments 26 of the segment chain 23 preferably have at least in part spike-like protrusions 32 in the region of the tip 29 of the support sections 28 for fastening the meat products to be transported. Such protrusions 32, so-called spikes, may be arranged or formed on selected segments 26 or on every segment 26. Each protrusion 32 may also have only a roughened surface or any other means for holding or penetrating the meat product.

In a preferred embodiment, devices for holding the fish down 33, 34 are assigned to the segment chain 23 downstream of the double belt 21 in transport direction T at least along a portion of the transport path, the devices for holding the fish down 33, 34 being arranged on both sides of the segment chain 23 and extending at a distance from the segment chain 23 and parallel thereto. The devices for holding the fish down 33, 34 may, for example, be simple round profiles. Preferably, the devices for holding the fish down 33, 34 are designed as rotationally driven conveyor belts 35, 36 with a guide run and a return run, wherein guiding surfaces 37, 38 of the guide run are aligned parallel to support surfaces or the transport partial surfaces 30, 31 of the support sections 28 of the segments 26 of the segment chain 23. The distance of the guiding surfaces 37, 38 from the transport partial surfaces 30, 31 of the segments 26 is adjustable. The devices for holding the fish down 33, 34 are preferably designed and configured to assist the segment chain 23 as an active means of helping to open up the partial fillets 12, 14 and they hold the partial fillets 12, 14 in a spread position.

The gap 22 of the double belt 21 may be continuously open. Preferably, the gap 22 of the double belt 21 is covered at least partially by a cover element 39, wherein the cover element 39 comprises a gap 40 at least in the transition region Ü, which gap has a smaller width transverse to the transport direction T than the gap 22 of the double belt 21. The cover element 39 is preferably a simple cover plate which is arranged and fastened between the partial belts 24, 25 with low friction or no friction to the partial belts 24, 25.

The gap 40 in the cover element 39 in the overlap region Ü allows the segment chain 23 to project, at least with its upwardly directed tips 29 and/or protrusions 32 of the individual segments 26, through the gap 22 of the double belt 21 and the gap 40 of the covering element 39 beyond the plane E defined by the double belt 21 (in relation to the surface of the double belt 21). In other embodiments, the segment chain 23 may itself lie with its tips 29 and/or protrusions 32 in the gap 22, 40 in or below the plane E defined by the double belt 21.

Preferably, both conveying elements 19, 20 and their drive means are connected to a control device 41. The control device 41 may be designed as a programmable logic controller or as a microprocessor-based controller and optionally comprises at least one memory unit as well as at least one control module for active control.

The method is explained in greater detail below with reference to the drawing: The method is used for automatically conveying fillet-like meat products, in particular fish fillets. The meat products are transported by means of a first conveying element 19 along a transport path in transport direction T. The meat products are transferred to a second conveying element 20 in a transition region Ü. The meat products are transported by means of the second conveying element 20 along the transport path in transport direction T.

This method is characterised according to the invention in that the meat products are transported on a double belt 21 with a gap 22 running centrally and parallel to the transport direction T as the first conveying element 19 and are taken over in the transition region Ü by a segment chain 23, which is triangular in cross-section, as the second conveying element 20, the meat products being transported onwards by the segment chain 23.

The meat products are preferably transported lying flat on the double belt 21 along a continuously level and horizontal transport surface in the plane E, while the meat products on the segment chain 23 are transported in an angled position along an angled transport surface with transport partial surfaces 30, 31 sloping laterally and downwards on both sides of the segment chain 23. On the double belt 21, the meat products are supported and transported flat on a level and substantially horizontal transport surface—with the exception of the region of the gap 22. On transfer of the meat products from the segment chain 23, the meat product opens up automatically—preferably by the force of gravity alone—on leaving the double belt 21, in that the two partial fillets 12, 14 fold sideways and downwards due to the structural design of the segment chain 23. Opening up of the partial fillets 12, 14 may also be actively assisted. The meat products are then transported further on an angled transport surface, such that regions which were still facing each other on the horizontal transport surface of the double belt 21 now point upwards or at least obliquely upwards.

This effect is particularly evident when already processed meat products, such as tuna fillets in which a middle, central partial strip of red meat has been removed from the fish fillet 11, are transported on the segment chain 23. Then the cut surfaces $F_1$, $F_2$ of a ventral-side partial strip of red meat still attached to the fish fillet 10 and of a dorsal-side partial strip of red meat still suspended from the fish fillet 10, which are formed on removing the middle, central partial strip, point upwards away from the conveying unit 18.

The meat products are preferably transported at least in the transition region Ü by both the double belt 21 and the segment chain 23 at the same time. In other words, a "flying" transfer takes place in that the leading end of the meat product is already being transported by the segment chain 23, while a trailing end of the meat product is still being transported by the double belt 21.

Especially preferably, the method is carried out using a conveying unit 18 according to one or more of claims 1 to 11.

The invention claimed is:

1. A conveying unit, designed and configured for automatically conveying fillet-like meat products, comprising:
   a first conveying element rotationally driven by a drive; and
   a second conveying element rotationally driven by a drive in transport direction T of the meat products to be conveyed, the second conveying element being downstream of the first conveying element;
   the first and second conveying elements forming a continuous transport path, along which different processing stations may be arranged;
   wherein the first conveying element comprises a double belt with a gap running centrally and parallel to the transport direction; and
   the second conveying element comprises a segment chain which is triangular in cross-section.

2. The conveying unit according to claim 1, wherein the double belt and the segment chain overlap in a transition region, in such a manner that the meat products to be transported are temporarily in contact with both conveying elements at the same time.

3. The conveying unit according to claim 2, wherein the double belt and the segment chain form a continuous conveying unit running substantially horizontally in the transport direction, wherein the segment chain engages in the double belt from below through the gap, at least in the transition region from the double belt to the segment chain, for transferring the meat products to be transported from the double belt.

4. The conveying unit according to claim 1, wherein:
   the double belt comprises two partial belts arranged at a distance from each other;
   each of the two partial belts has a transport run and a return run; and
   the two transport runs form a continuously level and horizontal transport surface with a transport side of each of the partial belts directed upwards.

5. The conveying unit according to claim 1, wherein the segment chain comprises a transport run and a return run and is formed from a plurality of individual segments, wherein each segment has a base section and a roof-shaped support section, such that the segment chain with the transport run, starting from a tip of the roof-shaped support sections, forms an angled transport surface with transport partial surfaces sloping laterally and downwards on both sides of the segment chain.

6. The conveying unit according to claim 5, wherein:
   the base section and support section of each segment are integrally connected to each other;
   the support sections point upwards in the transport run in a direction of the gap of the double belt and protrude with their tip at least partially through the gap beyond a plane defined by the double belt.

7. The conveying unit according to claim 5, wherein the segments of the segment chain have at least in part spike-like protrusions in a region of the tip of the support sections for fastening the meat products to be transported.

8. The conveying unit according to claim 5, further comprising devices for holding the meat products down, the devices being assigned to the segment chain downstream of the double belt in the transport direction at least along a portion of the transport path, the devices for holding the meat products down being arranged on both sides of the segment chain and extending at a distance from the segment chain and parallel thereto.

9. The conveying unit according to claim 8, wherein the devices for holding the meat products down comprise rotationally driven conveyor belts each with a guide run and a return run, wherein guiding surfaces of each guide run are aligned parallel to support surfaces of the support sections of the segments of the segment chain.

10. The conveying unit according to claim 1, further comprising a cover element at least partially covering the gap of the double belt, the cover element comprising a gap at least in a transition region, which gap has a smaller width transverse to the transport direction than the gap of the double belt.

11. The conveying unit according to claim 1, further comprising a control device connected to each of the conveying elements or the drives.

12. The conveying unit according to claim 1, wherein the meat products are fish fillets.

13. The conveying unit according to claim 1, wherein the segment chain is adapted to fold a meat product transported by the segment chain.

14. The conveying unit according to claim 1, wherein the conveying unit is a meat product-conveying unit.

15. A method for automatically conveying fillet-like meat products, comprising the steps:
   transporting the meat products by means of a first conveying element along a transport path in a transport direction;
   transferring the meat products to a second conveying element in a transition region; and
   transporting the meat products by means of the second conveying element along the transport path in the transport direction;
   wherein the meat products are transported on a double belt with a gap running centrally and parallel to the transport direction as the first conveying element and are taken over in the transition region by a segment chain, which is triangular in cross-section, as the second conveying element, and wherein the meat products are transported onwards by the segment chain.

16. The method according to claim 15, wherein the meat products are transported at least in the transition region by both the double belt and the segment chain at the same time.

17. The method according to claim 15, wherein the meat products are transported lying flat on the double belt along a continuously level and horizontal transport surface, while the meat products on the segment chain are transported in an angled position along an angled transport surface with transport partial surfaces sloping laterally and downwards on both sides of the segment chain.

18. The method according to claim 15, wherein the method is carried out with a conveying unit comprising:
 a first conveying element rotationally driven by a drive; and
 a second conveying element rotationally driven by a drive in transport direction T of the meat products to be conveyed, the second conveying element being downstream of the first conveying element;
 the first and second conveying elements forming a continuous transport path, along which different processing stations may be arranged;
 wherein the first conveying element comprises a double belt with a gap running centrally and parallel to the transport direction; and
 the second conveying element comprises a segment chain which is triangular in cross-section.

19. The method according to claim 15, wherein the meat products are fish fillets.

20. The method according to claim 15, wherein the segment chain is adapted to fold the meat products transported by the segment chain.

\* \* \* \* \*